United States Patent Office 3,782,944
Patented Jan. 1, 1974

3,782,944
PROCESS FOR THE POLYMERIZATION OF VINYL COMPOUND
Yoshihide Hayakawa and Masato Satomura, Kanagawa, Japan, assignors to Fuji Photo Film Co., Ltd., Minami Ashigara-shi, Kanagawa, Japan
No Drawing. Continuation of application Ser. No. 137,982, Apr. 27, 1971, which is a continuation of application Ser. No. 701,873, Jan. 31, 1968, both now abandoned. This application Oct. 10, 1972, Ser. No. 296,503
Claims priority, application Japan, Jan. 31, 1967, 42/6,213
Int. Cl. G03c *1/68, 1/70*
U.S. Cl. 96—48 R                    21 Claims

ABSTRACT OF THE DISCLOSURE

A process for the selective polymerization of a polymerizable vinyl compound which comprises exposing a gelatino silver halide photographic emulsion layer containing silver halide particles to electromagnetic waves or particle rays to give centers of development to said silver halide particles causing the silver halide photographic emulsion layer to react, in the presence of at least one vinyl compound, with a naphthol derivative having two hydroxyl groups, or one hydroxyl group and one amino group at the 1,6-positions, 1,8-positions, 2,5-positions or 2,7-positions on the naphthalene nuclei.

CROSS-REFERENCE TO RELATED APPLICATIONS

This application is a continuing application of our copending application Ser. No. 137,982, filed Apr. 27, 1971, now abandoned, which application was a streamlined continuation application of our further earlier co-pending application Ser. No. 701,873, filed Jan. 31, 1968, now abandoned, claiming priority from Jan. 31, 1967, based on Japanese application Ser. No. 42/6,213.

BACKGROUND OF THE INVENTION (1) Field of the invention

This invention relates to the polymerization of vinyl compounds. The invention relates more particularly to a process for forming an image of a highly polymerized compound utilizing a silver halide photographic emulsion layer which has been subjected to imaging irradiation by electromagnetic waves or particle rays.

(2) Description of the prior art

There have been proposed various methods of forming images by the formation of highly polymerized compounds by photopolymerization of vinyl compounds. It has been proposed to effect directly photopolymerization using silver halides as the catalyst (British Pat. No. 866,-631; S. Levinos et al., Photographic Science and Engineering; vol. VI, pp. 222–226, 1962). It is believed, in this reaction, that the photo-induced decomposition product of silver halide serves as the polymerization catalyst, and the sensitivity to light of this reaction does not reach the level which is easily attained by an ordinary developing out process. It has also been proposed to form images of highly polymerized compounds by polymerizing vinyl compounds using as a catalyst a silver image or unreacted silver halide, after development of an exposed silver halide emulsion with an ordinary developing solution (Belgian Pat. No. 642,477). This procedure has the defect that the development and polymerization should be conducted separately. It is theoretically of great interest to effect polymerization of vinyl compounds by the oxidation product or intermediate thereof formed in the course of development of a photographic silver halide emulsion by a reducing agent in the presence of the vinyl compounds, since it can be expected that, in this procedure, the polymerization is effected by both the amplifying effect of development and that of chain polymerization. It has already been proposed to effect such a reaction using as a reducing agent a benzenoid compound having at least two hydroxyl, amino or alkyl- or aryl-substituted amino groups in the ortho- or para-positions with each other on a benzene ring (U.S. Pat. No. 3,019,104; G. Oster, Nature, vol. 180, p. 1275, 1957).

An object of the present invention is to convert a latent image on a photographic silver halide emulsion layer, formed by electromagnetic waves or particle rays, into an image of a highly polymerized substance by a simple procedure. Another object of this invention is to obtain a polymer image of desired properties by employing this procedure in recording or printing.

SUMMARY OF THE INVENTION

We have discovered that the polymerization of a vinyl compound is effected by reducing a silver halide, in the presence of the vinyl compound, with naphthols or their derivatives as disclosed hereinafter.

In cases where the silver halide is in the form of a silver halide photographic emulsion, the reaction proceeds at a higher rate when the silver halide grains contain centers of development than when the grains have no developing centers. In this way polymerization can be performed, with proper selection of reaction conditions and durations, selectively in the areas of the emulsion where silver halide particles exist with centers of development, that is, in the case where the photographic emulsion layer has a latent image. The present invention is attained by employing this fact.

Thus, the present invention consists in subjecting a silver halide photographic emulsion layer which has received imaging exposure to electromagnetic waves or to particle rays and in which development centers exist in many silver halide grains, in either the areas that have received or that have not received said exposure, as a result of said exposure, to the action of at least one naphthol derivative having two hydroxyl groups, or one hydroxyl group and one amino group at the 1,6-positions, 1,8-positions, 2,5-positions, or 2,7-positions on the naphthalene nuclei in the presence of a polymerizable vinyl compound or compounds, and polymerizing said vinyl compound or compounds in the area in which development centers exist in many silver halide grains.

DETAILED DESCRIPTION OF THE INVENTION

In the practice of the present invention there may be used ordinary silver halide emulsion that form centers of development in the areas irradiated by electromagnetic waves or particle rays and yield negative images, and there may also be used so-called direct positive emulsions that have centers of development in silver halide particles in the areas not subjected to the imaging exposure.

In the present invention, as a silver halide photographic emulsion that gives a negative image, an emulsion which is suitable for ordinary developing out processes can conveniently be used. Thus, silver chloride, silver bromide, silver chlorobromide, silver iodobromide and silver chloro-iodobromide photographic emulsions can be used. Chemical sensitization and/or optical sensitization which are applicable to ordinary photographic emulsions can be applied to the silver halide emulsions for the present invention. Thus sulfur sensitization and noble metal sensitization are applicable for the chemical sensitization and noble metal sensitization are applicable for the chemical sensitization (see for example P. Glafkides, Chimie Photographique 2nd Edition, Photocinema Paul Montel, Paris, 1957, pp. 247–301). As for optical sensitization, optical sensitizers for ordinary photographic emulsions, such as cyanine dyes and merocyanine dyes, can be used conveniently (see for example, Kikuchi et al., Kagaku Shashin Benran (Handbook of Scientific Photography), vol. II, pp. 15–24, Maruzen Co., Tokyo, 1959). The emulsion to be used in the present invention may also contain stabilizers as employed in the conventional photographic techniques.

The direct positive silver halide emulsion which can be employed in the present invention may be prepared by applying solarization, Herschel effect, Clayden effect or Sabatier effect, etc. On these effects full explanations are given in Chapters 6 and 7, by C. E. K. Mees, of "The Theory of the Photographic Process," the second edition, published by McMillan & Co., 1954. To prepare direct positive silver halide photographic emulsions applying solarization, silver halide emulsion susceptible to solarization is prepared and then, subjected to uniform exposure to light or to the action of a chemical to render it developable without imagewise exposure. For example, the methods of preparation of such emulsions are disclosed in British Pat. Nos. 443,245 and 462,730.

The Herschel effect is produced by exposing to a light of longer wavelength a photographic emulsion which has been rendered developable by a uniform exposure to light of shorter wavelength or a uniform action of a chemical reagent. In this case it is preferable to use a silver halide emulsion containing silver chloride for the most part and a desensitizer, such as, phenosafranine or pinakryptol yellow, may be added to the emulsion to enhance the effect. For example, the method of preparation of direct positive emulsions applying the Herschel effect is disclosed in British Pat. No. 667,206 and U.S. Pat. No. 2,857,273.

In order to obtain a positive image directly by using the Clayden effect, it is necessary to subject an emulsion to over-all exposure to light of a relatively low intensity, after imaging exposure of light of a high intensity for a short period of time. In this way, the areas of the emulsion which have not been exposed to irradiation by the high intensity light become developable, after the over-all exposure.

The Sabatier effect is produced by exposing, to a uniform action of light or a chemical reagent, in a state of immersion in a developing solution, a silver halide photographic emulsion layer that has received imaging exposure to light. This gives rise to development capability in the area that has not been exposed to the imaging exposure. The Clayden effect and Sabatier effect are easily and practically obtained in silver halide emulsions that have a tendency to yield centers of development, by the first exposure, in the inner portion rather than in the surface portion of grains of silver halide. The method of preparing such emulsions that have a tendency to yield internal centers of development is disclosed for example in U.S. Pat. Nos. 2,592,250 and 2,497,876, British Pat. No. 1,011,062 and German Pat. No. 1,207,791.

The photographic emulsions mentioned above consist of dispersion systems in which particles of silver halide are dispersed in a solution of a high polymer. As the high polymer for this purpose gelatin is widely employer. Polyvinyl alcohol, polyvinyl pyrrolidone, polyacrylamide and like synthetic high polymers and carboxymethyl cellulose, oxyethyl cellulose, dextran and like derivatives of naturally occurring high polymers may also be employed, either alone or in mixtures with gelatin (refer to F. Evva: Zeitschrift für Wissenschaftliche Photographie, Photophysik und Photochemie, vol. 52, pp. 1–24, 1957).

The compound to be employed in the present invention includes, for example, naphthol compounds as follows:

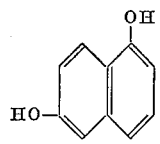
1,6-dihydroxynaphthalene

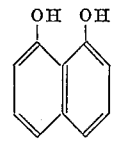
1,8-dihydroxynaphthalene

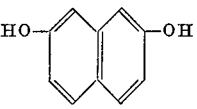
2,7-dihydroxynaphthalene

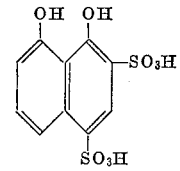
1,8-dihydroxynaphthalene-2,4-disulfonic acid

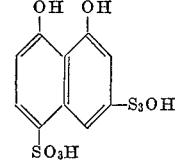
1,8-dihydroxynaphthalene-3,5-disulfonic acid

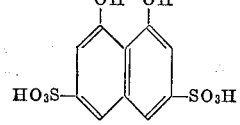
1,8-dihydroxynaphthalene-3,6-disulfonic acid

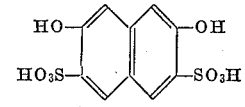
2,7-dihydroxynaphthalene-3,6-disulfonic acid

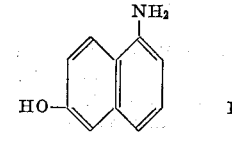
1-amino-6-naphthol

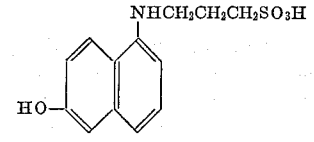
3-(6-hydroxy-1-naphthylamino)propane-1-sulfonic acid

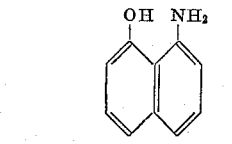
1-amino-8-naphthol

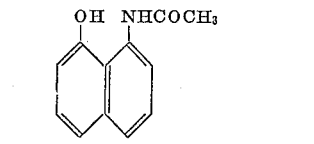
N-acetyl-1-amino-8-naphthol

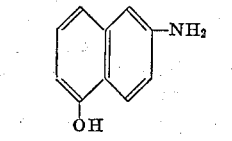
2-amino-5-naphthol

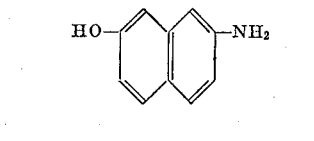
2-amino-7-naphthol

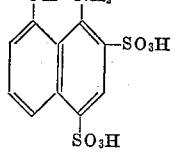

1-amino-8-naphthol-2,4-disulfonic acid,
2,7-dihydroxynaphthalene monomethyl ether,
1-amino-8-naphthol-3,5-disulfonic acid,
1-amino-8-naphthol-3,6-disulfonic acid,
1-amino-8-naphthol-4,6-disulfonic acid,
1-amino-8-naphthol-5,7-disulfonic acid,
1-amino-8-naphthol-4-sulfonic acid,
8-amino-1-naphthol-4-sulfinic acid,
2-amino-5-naphthol-7-sulfonic acid.

The process for synthesis of such phenolic compounds is well known in the art and the compounds are commercially available.

The vinyl compounds to be employed in the present invention include normally liquid and solid compounds capable of addition polymerization and mixtures thereof. Examples are acrylamide, acrylonitrile, N-hydroxymethyl-acrylamide, methacrylic acid, acrylic acid, calcium acrylate, sodium acrylate, methacrylamide, methyl methacrylate, methyl acrylate, ethyl acrylate, vinyl-pyrrolidone, vinyl methyl ether, vinyl butyl ether, vinyl isopropyl ether, vinyl butyrate, 2-vinylpyridine, 4-vinylpyridine, 2-methyl-N-vinylimidazole, potassium vinylbenzenesulfonates, vinyl carbazole and the like. For the present invention compounds having two or more vinyl groups are particularly suitable, and the compounds may be used alone or in mixture with a monovinyl compound as listed above. Examples of such compounds having two or more vinyl groups are N,N'-methylenebis(acrylamide), ethylene glycol dimethacrylate, diethylene glycol dimethacrylate, triethylene glycol dimethacrylate, polyethylene glycol dimethacrylates, divinyl ether, divinylbenzene and the like.

Although it is convenient for the present invention to employ water soluble vinyl compounds, water insoluble vinyl compounds may be employed in the form of emulsions. The emulsification may be carried out in a conventional manner using a suitable agitating device in the presence of a surface active agent and/or a high polymer.

In carrying out the present invention it is necessary to conduct the step of irradiation by electromagnetic waves or particle rays and the step of reduction and polymerization. In particular in the recording of images, it is necessary that the silver halide grains change their locations little during the period between the irradiation by electromagnetic waves or particle rays and the polymerization in the reaction system and, accordingly, it is preferable that the system be maintained in a highly viscous liquid state or in a gel state. While photographic emulsions have some viscosity and are susceptible to gelling, since they contain natural or synthetic high polymers, some high polymers may be added to the emulsion before use, if necessary.

On irradiation by electromagnetic rays or particle rays the silver halide grains may be dispersed in an aqueous solution or held in a dry gel. Thus, a highly viscous or gelled photographic emulsion on a suitable support or substrate may be subjected to the irradiation, either in an undried state or a dried state. As the reduction and polymerization take place concurrently the reduction should be conducted in the presence of a vinyl compound or compounds. While in the present invention both the vinyl compound and the naphthol compound may be incorporated in the photographic emulsion before exposure, only one of them may be incorporated in the emulsion before exposure, the other being added to the system after the exposure and it is also possible to add both compounds after exposure.

As the reduction and polymerization must be conducted in the presence of water, it is necessary to conduct the reduction and polymerization in an aqueous solution or in a wet gel.

In general the reaction is conducted in the presence of a suitable quantity of an alkali, as it proceeds smoothly under alkaline conditions. While the amount of alkali suitable for the reaction depends on the kind of silver halide, of reducing agent and of high polymer in the system and their concentrations and the reaction temperature, it is preferable to use an amount sufficient to make the pH of the system 7.5 or more. In the cases where the photographic emulsion is used in the form of a coated film on a support, the reaction can be performed by immersing the thus produced photosensitive material in an alkaline aqueous solution, after it has been exposed to the electromagnetic waves or particle rays. In this case the vinyl compounds and/or the reducing agents can be conveniently dissolved in the aqueous alkaline solution.

Although stopping of the reaction is readily achieved by adjusting the pH of the system to, e.g., 5 or less, it may also be attained by cooling, removing the reactants by washing, dissolving the silver halide by fixation or adding a polymerization inhibitor to the system.

In the case where the high polymer as the vehicle for the silver halide grains and the monomeric vinyl compound are mixed and coated together to form a film, it is preferable to add a small amount of an inhibitor for thermal polymerization in order to prevent the spontaneous thermal polymerization of the vinyl monomer. For such a polymerization inhibitor any of the known thermal radical polymerization inhibitors, such as p-methoxyphenol, hydroquinones, 2,6-di-tert.butyl-p-cresol, $\beta$-naphthol and the like, can be utilized.

When the vinyl monomer is contained in the system from the first, it is incorporated in an amount by weight of from 1/30 to 30, and preferably from 1/4 to 4 times the amount of the high polymer which is originally present in the system. The silver halide is conveniently used in an amount by weight of from 1/20 to 2, and preferably 1/10 to 1/2 times the amount of the high polymer which is originally present in the system. When the reducing agent is to be added to the system before the reaction, it is suitable to add it in the amount of from 1/10 to 20 moles per mole of the silver halide. It is convenient to add the thermal polymerization inhibitor in an amount of from 10 to 20,000 p.p.m. of the weight of the vinyl compound. In the case where the vinyl monomers are dissolved in the processing solution, it is usually preferable to dissolve them in as high a concentration as possible, hence the preferable concentration of the monomer is determined mainly by the solubility of the monomer in the solution. In the case where the naphtholic reducing agents are dissolved in the processing solution, it is suitable to dissolve them in a concentration between 1/20 and 5 moles per liter, and preferable between 1/10 and 1 mol per liter.

It is similar to the ordinary silver halide photographic process in that there can be any interval of time between the exposure to electromagnetic waves or particle rays and the processing of polymerization. In some cases, according to the characteristics of the photographic emulsion or the condition and the length of the interval, the effect of the exposure may be diminished to some extent and in this case the decrease in effect can be cancelled by increasing the amount of the exposure.

In case of applying the process of the present invention in recording images, it is possible to make use of differences in solubility, light scattering, tackiness, dye-receptivity and other physical and chemical properties between monomeric vinyl compounds and polymers thereof. Relief image of polymeric material may be formed by dissolving away unpolymerized portions after the irradiation and polymerization, making use of the difference in solubility between the polymerized portions and the unpolymerized portions so as to leave the thus formed highly polymerized compound as an image only in the irradiated areas.

In this case, it is convenient that the high polymer originally present in the system can be washed away with unpolymerized vinyl compound. Accordingly, it is preferable that the high polymer originally present in the system be a linear, substantially uncrosslinked one, or such a crosslinked one that is susceptible to chain fission or break-up of crosslinkage, and that the highly polymerized compound formed by the polymerization of the vinyl compound is a crosslinked one of so-called three-dimensional structure. For this reason it is convenient to employ a compound having a plurality of vinyl groups, as set forth above, either alone or in combination with a compound having only one vinyl group. It is, however, not essential to employ the compound having a plurality of vinyl groups, since there are many instances where a great extent of difference exists between the portions containing the high molecular substance formed by polymerization of the vinyl compound and the portions not containing such high polymeric substance. This is true even if the resulting highly polymerized substance is a linear soluble one, due to interaction of the highly polymerized substance formed by polymerization and the high polymer originally present in the system, as in the case of polyacrylic acid and gelatin.

The image which is made by this procedure and consists of highly polymerized substances can be applied in various printing processes.

While the mechanism of initiating the polymerization of the vinyl compounds with reduction of silver halide with said naphthols is not yet clear, it is believed that the polymerization proceeds as a radical polymerization mechanism, since the process is applicable to any vinyl compounds capable of radical polymerization and the reaction is retarded by radical polymerization inhibitors. It is not yet clear whether the radical is formed directly by the reaction between naphthols and silver halide or is formed by a further reaction with other components in the system, such as water, oxygen, etc.

The tanning development process, in which gelatin molecules are crosslinked with the oxidation products of the developing agent, has been well known in the art as a process for making an image consisting of high polymer. However, in this process the available image is restricted to that which consists of crosslinked gelatin. In contrast, according to the present invention, it is possible to obtain a variety of images differing in dye-receptivity, chemical resistance and other properties depending on the nature of the vinyl compound being employed. This is a characteristic of the present invention.

Furthermore, we have found that the polymerization of the vinyl compound in the process of the present invention is accelerated by the presence of sulfite ions in the system.

Sulfite ion may be added to the reaction system either in the form of a compound, which has originally contained the sulfite ion in the molecule, such as, alkali metal sulfites or ammonium sulfite, or in the form of a compound which will give a sulfite ion as the result of hydrolysis, such as, pyrosulfites of alkali-metals and ammonium or the adducts of bisulfites with aldehydes, such as, formaldehyde or glyoxal. Although the appropriate amount of sulfite ion to be added depends upon the nature and amount of the reducing agent and the vinyl monomer being used, the pH of the system and other factors, more than 0.05, especially more than 0.2 mole per liter of the system is effective.

It is commonly known in the art to add a sulfite in photographic developing solutions, and in such cases it is believed that the sulfite prevents auto-oxidation of a developing agent and uneven development, by reacting with the oxidation products of the developing agents, such as hydroquinone or p-amino-phenol (see, for example, C. E. K. Mees "Theory of the Photographic Process," the second edition, p. 652, published by McMillan Co. in 1954). It should be noted that since the intermediate product of oxidation of naphthols by silver halide initiates polymerization of vinyl compound or compounds in the process of the present invention the polymerization promoting effect of sulfite ion is essentially different from the action of removing oxidation products, as in the ordinary developing solutions mentioned above. The polymerization would be inhibited rather than promoted, if the sulfite simply removes the oxidation products as in conventional developing processes.

While the mechanism of action of sulfite ion in the process of the present invention is not obvious, it may be that the sulfite ion prevents the polymerization inhibiting action of free oxygen.

EXAMPLE 1

A photographic film bearing a layer of gelatino silver chloroiodobromide emulsion was, after exposure, treated with a solution containing both 2,7-dihydroxynaphthalene and sodium methacrylate to effect image forming polymerization. The photographic film was one that had been prepared by applying a subbing coat to both sides of a polyethylene terephthalate film, applying an anti-halation layer to one of the surfaces of the so under-coated film and applying to the other surface a silver halide photographic emulsion containing, per mol of silver, about 0.7 mol of chlorine, about 0.3 mol of bromine, about 0.001 mol of iodine, and about 100 g. of gelatine together with a suitable amount of merocyanine dye having a sensitization maximum of about 550 m$\mu$ for the sake of optical sensitization, 1.5 g. of mucochloric acid as a hardening agent, and suitable stabilizing and wetting agents. A coated film containing 50 mg. of silver per 100 cm.$^2$ was formed. There was further applied to said emulsion layer a gelatin protective layer of about 0.8$\mu$ in thickness. The material is suitable for making line or half-tone images for graphic arts. The film was exposed to light of 100 luxes for 10 seconds through a negative of a line image, and then immersed under a red safe-light, in a solution of the following formulation:

Sodium methacrylate _____ g__ 50
2,7-dihydroxynaphthalene _____ g__ 4.8
2 N aqs. sodium hydroxide _____ cc__ 1.7
Water to make 1000 cc.

After 30 minutes of immersion at 35° C., the exposed areas discolored, indicating that the silver halide grains in the exposed areas were reduced (so-called development). The film was then soaked in a 1.5% aqueous acetic acid, washed with running water and treated with 1% aqueous solution of a gelatin-decomposing enzyme (sold under the trade name of "Biopraze PN4" sold by Nagase & Co., Ltd. Osaka, Japan) whereupon in the non-exposed areas gelatin was decomposed and washed away while in the exposed areas the emulsion layer was not washed away and a positive relief image was left corresponding to the negative image used for exposure. The difference in resistance for decomposition between the exposed areas and unexposed areas was not recognized when the treating solution contained no sodium methacrylate.

EXAMPLE 2

Samples of the same film as employed in Example 1 were exposed as in Example 1 and treated with solutions of the following formulations:

Sodium methacrylate _____ 50 g.
Naphthols _____ As indicated in following table.
Sulfites _____ As indicated in following table.
NaOH _____ Amount sufficient to adjust the pH to a following table.
Water to make 1000 cc.

| No. | Naphthol | G. | Sulfite | G. | pH |
|---|---|---|---|---|---|
| 1 | 1,8-dihydroxynaphthalene-3,6-disulfonic acid. | 13.0 | Potassium purosulfite. | 2 | 9 |
| 2 | 1-amino-8-naphthol-3,6-disulfonic acid. | 10.0 | Sodium sulfite | 8 | 11.5 |
| 3 | do | 10.0 | Potassium pyrosulfite. | 2 | 10.5 |
| 4 | do | 10.0 | Adduct of sodium sulfite with formaldehyde (monohydrate). | 8 | 10.5 |
| 5 | 1-amino-8-naphthol-2,4-disulfonic acid. | 100 | Potassium pyrosulfite. | 2 | 10.0 |
| 6 | 1-amino-6-naphthol | 4.7 | do | 2 | 9.0 |
| 7 | 3-(6-hydroxynaphthylamino)propane 1-sulfonic acid. | 12.0 | do | 2 | 9.0 |
| 8 | 1,5-dihydroxynaphthalene. | 4.8 | do | 2 | 11.5 |

Each sample was treated with the solution at 35° C., for the following times and then with an enzyme as in Example 1.

Similar results as in Example 1 were obtained, in every case.

Treating solution No. _____ 1 2 3 4 5 6 7 8
Treating time (min.) _____ 25 10 10 15 5 10 10 20

EXAMPLE 3

The following film A and B were treated with the treating solution No. 3 used in Example 2.

*Film A* is one that is usually employed in preparation of a positive for photogravure in photoengraving processes and is prepared by applying to both sides of a cellulose triacetate base a subbing layer, applying to one surface of the so subbed base an anti-halation layer, applying to the other surface of the base a moderate grain size gelatin-silver halide emulsion, containing about 0.015 mole of iodine and about 0.985 mole of bromine and about 255 g. of gelatin per mole of silver, to which about 0.5 g. per 100 g. of gelatin, of mucochloric acid, as hardening agent, and a suitable stabilizer and surface active agent was added, in an amount to provide a coating layer containing 60 mg. of silver per 100 square centimeter, and applying thereover a protective layer of gelatin of 1 micron thickness.

*Film B* is one that is usually employed in preparation of line images or continous tone images with steep gradation in photoengraving process and prepared by, to the same base as the film A, applying a fine grain gelatin-silver halide emulsion containing about 0.012 mole of iodine and about 0.988 mole of bromine and 204 g. of gelatin per mole of silver, and sensitized with a rhodanate complex of monovalent gold and combined with about 0.7 g. per 100 g. of gelatin, of mucochloric acid as a hardening agent, 0.3 g. per mole of silver, 6-methyl-4-hydroxy-1,3,3a,7-tetrazaindene as a stabilizing agent and a suitable surface active agent, in an amount to provide a coating layer containing 60 mg. of silver per 100 sq. cm., and applying thereover a protective layer of gelatin of about 0.8 micron thickness.

After the same exposure as in Example 1, Film A and B were soaked in a treating solution 3 in Example 2 at 30° C., for 15 minutes and 10 minutes, respectively, to obtain image undecomposable with the gelatin decomposing enzyme as in Example 1.

EXAMPLE 4

A solution of the following formulation was added to 100 cc. of a fine grain gelatino silver chlorobromide photographic emulsion which contained silver chlorobromide, corresponding to about 42 g. of elementary silver and containing chlorine and bromine in molar ratio of 7:3, and about 60 g. of gelatin per liter of the emulsion, and had pH value of 5.8 and pAg value of 7.6.

| | | |
|---|---|---|
| Acrylamide | g | 8 |
| N,N'-methylene bisacrylamide | g | 0.8 |
| Potassium pyrosulfite | g | 4 |
| 0.02 mol paramethoxyphenol | cc | 1.0 |
| Water | cc | 15 |
| 10% chromium alum | cc | 0.3 |

The mixture solution was coated on an undercoated cellulose triacetate film and dried in a dark room to give a dried thickness of 10μ. The photographic film was exposed to light of 1000 luxes for 5 seconds from the opposite surface to emulsion layer thereof through a negative of a line image and coated with a solution of following formulation, and left standing in the dark room.

| | | |
|---|---|---|
| 1-amino-8-naphthol-3,6-disulfonic acid | g | 10 |
| Potassium pyrosulfite | g | 2.5 |
| 2 N NaOH | cc | 20 |
| NaCl | g | 1 |

Water to make 100 cc.

It was recognized that the exposed areas of said film discolored, indicating that a faint silver image was produced in the exposed areas.

After 1 hour of standing the film was washed with hot water, whereupon in the non-exposed areas gelatin was washed away and a positive relief image was left corresponding to the negative image used for exposure.

When the same procedure as above-mentioned was repeated except that 8 g. of acrylamide was replaced by less than 4 g. of acrylamide it was difficult to distinguish the exposed areas from the unexposed areas because the difference in the strength between the exposed areas and the unexposed areas after treatment was small.

EXAMPLE 5

A gelatino silver chloride photographic emulsion having centers of fog which had been prepared chemically in the similar manner as disclosed in British patent specification 667,206, said emulsion containing pinakryptol yellow as a desensitizing agent, suitable hardening agents and surface active agents, was applied to a polyethylene terephthalate film bearing a subbing layer. The photographic film being so-called autopositive photographic film utilizing Herschel effect was exposed to light of 2K watt xenon arc lamp at a distance of 50 cm., passed through a yellow filter for 2 minutes through an original of a line image, and then immersed in a solution of the following formulation:

| | |
|---|---|
| Sodium methacrylate | 50 g. |
| 1-amino-8-naphthol-3,6-disulfonic acid | 13 g. |
| Potassium pyrosultite | 1.3 g. |
| NaCl | 1.0 g. |
| NaOH | Amount sufficient to adjust the pH of the solution to 10.0. |

Water to make 100 cc.

After imersion at 30° C. for 7 minutes, the film was soaked in 1.5 wt. percent aqueous acetic acid to stop the reaction, washed with water and decomposed with enzyme by the same procedure as in Example 1.

Then, polymerized areas corresponding to printed positive images remained. Another sample made by the same procedure as above-mentioned, but without the decomposition by enzyme, was immersed in a 1.5% aqueous acetic acid to stop the reaction, then treated with a usual photographic fixing solution. Faint brown color silver images were recognized in the exposed areas, which were about 2 microns thicker than the unexposed areas.

In the case of processing the same solution but without methacrylate, the thickening in the image areas could not be recognized, so it is believed that the thickening is due to the polymerization of methacrylate.

EXAMPLE 6

The same film as in Example 1 was exposed to X-rays and treated with the same solution as in Example 1, using a cobalt-X-ray tube made by Philips Co., at 30 k.v., 10 ma. The specimen of the film was partially covered with a razor blade of 0.2 mm. thickness and located 1 cm. from the window of the tube, and then treated with a solution as in Example 1 at 30° C. for 9 minutes. Only the irradiated areas were darkened and there remained a polymer relief after enzyme decomposition in a similar manner as in Example 1.

EXAMPLE 7

A polymerization was conducted using a photographic emulsion containing no gelatin, which was produced by reacting silver nitrate with alkali halide in a solution of polyvinylpyrrolidone to prepare silver halide, coagulating polyvinylpyrrolidone and silver halide with acetone, removing the by-produced salts by decantation, redispersing the coagulated compositions and then ripening, said emulsion containing chlorine and bromine in molar ratio of 7:3, 100 g. of polyvinylpyrrolidone, 300 g. of polyvinylalcohol and $2.4 \times 10^{-6}$ mol of sodium thiosulfate, as a chemical sensitizing agent, per mole of silver.

The emulsion thus formed was applied in a dark room to an undercoated cellulose triacetate film to form a dried layer of about 5 microns in thickness. After drying, the photographic film was exposed to 500 w. xenon lamp at a distance of 50 cm. for 10 seconds through a line image of original, and treated with a solution of the following formulation:

| | |
|---|---|
| Sodium methacrylate g | 75 |
| N,N'-methylenebisacrylamide g | 8 |
| 1 - amino - 8-naphthol-3,6-disulfonic acid sodium salt g | 19.7 |
| Potassium pyrosulfite g | 12 |
| Borax g | 7.5 |
| Water cc | 75 |
| 2 N NaOH cc | 116 |

After treatment at 30° C. for 15 minutes, faint brown color silver images were recognized. The film was then immersed in a 1% aqueous solution of acetic acid to stop the reaction, and immediately washed with running water. Then the unexposed areas were washed out by water leaving the exposed area undissolved to give a polymer image corresponding to a negative image of the original.

What is claimed is:

1. A process for the selective polymerization of a polymerizable vinyl compound comprising:
   providing a gelatino silver halide photographic emulsion layer containing silver halide particles;
   imagewise exposing areas of said emulsion layer to electromagnetic waves or particle rays, thereby giving centers of development to said silver halide particles in the areas of said emulsion layer which are to be polymerized; and subsequently
   reducing said silver halide particles having centers of development by treating said particles, in the presence of at least one vinyl compound, with a naphthol derivative having two hydroxyl groups or one hydroxyl group and one amino group at the 1,6-positions, 1,8-positions, 2,5-positions or 2,7-positions on the naphthalene nucleus, whereby the polymerization of said vinyl compound is initiated by the oxidation product of said silver halide particles and said naphthol derivative.

2. The process as claimed in claim 1, wherein said polymerization is conducted in the presence of the sulfite ion.

3. The process as claimed in claim 1, wherein said derivative is selected from the group consisting of 1,6-dihydroxynaphthalene, 1,8-dihydroxynaphthalene, 2,7-dihydroxynaphthalene, 2,7 - dihydroxynaphthalene-monomethyl-ether, 1,8-dihydroxynaphthalene - 2,4 - disulfonic acid, 1,8-dihydroxy-naphthalene-3,5-disulfonic acid, 1,8-dihydroxynaphthalene-3,6-disulfonic acid, 2,7-dihydroxynaphthalene-3,6-disulfonic acid, 1-amino-6-naphthol, 3-(6-hydroxy-1-naphtholamino)propane-1-sulfonic acid, 1-amino-8-naphthol, N-acetyl-1-amino-8-naphthol, 2-amino-5-naphthol, 2-amino-7-naphthol, 1-amino-8-naphthol-2,4-disulfonic acid, 1-amino-8-naphthol-3,5-disulfonic acid, 1-amino-8-naphthol-3,6-disulfonic acid, 1-amino-8-naphthol-4,6-disulfonic acid, 1-amino - 8 - naphthol-5,7-disulfonic acid, 1-amino-8-naphthol-4-sulfonic acid, 8-amino-1-naphthol-4-sulfonic acid, 2-amino-5-naphthol-7-sulfonic acid.

4. The process as claimed in claim 1, wherein said vinyl compound is selected from the group consisting of acrylamide, acrylonitrile, N-hydroxy-methyl-acrylamide, methacrylic acid, acrylic acid, calcium acrylate, sodium acrylate, methacrylamide, methyl methacrylate, methyl acrylate, ethyl acrylate, vinyl pyrrolidone, vinylmethylether, vinylbutylether, vinylisopropylether, vinylisobutylether, vinylbutyrate, 2-vinylpyridine, 4-vinylpyridine, 2-methyl-N-vinylimidazole, potassium vinylbenzenesulfonic acid, and vinylcarbazole.

5. The process as claimed in claim 1, wherein said vinyl compound is selected from the group consisting of N,N'-methylenebisacrylamide, ethylene - glycoldimethacrylate, diethyleneglycol-dimethacrylate, triethyleneglycol-dimethacrylate, polyethylene glycol dimethacrylates, divinylether and divinylbenzene.

6. The process as claimed in claim 2, wherein said sulfite ion is supplied by a member selected from the group consisting of sodium sulfite, potassium sulfite, sodium pyrosulfite, potassium pyrosulfite, formaldehyde adduct of sodium bisulfite, and ammonium sulfite.

7. A process for making an image composed of a vinyl polymer corresponding to a photographic latent image which comprises reacting a silver halide photographic emulsion layer which bears a photographic latent image thereon, in the presence of at least one polymerizable vinyl compound, with a naphthol derivative having two hydroxy groups, or one hydroxy group and one amino group at the 1,6-positions, 1,8-positions, 2,5-positions 2,7-positions on the naphthalene nucleus, whereby said vinyl compound is polymerized in the areas of said emulsion layer where the silver halide grains of the latent image are reduced by reaction with said naphthol derivative.

8. The process as claimed in claim 7, wherein said polymerization is conducted in the presence of sulfite ion.

9. The process as claimed in claim 7, wherein said photographic emulsion is a negative photographic emulsion which gives a negative image by exposure to electromagnetic radiation or particle rays.

10. The process as claimed in claim 7, wherein said photographic emulsion is a positive working photographic emulsion which gives a positive image of the original on exposure to light.

11. The process as claimed in claim 7, wherein said image composed of a vinyl polymer forms a relief image.

12. The process as claimed in claim 8, wherein sulfite ion is present in an amount of at least 0.05 mole per liter of the entire system.

13. The process as in claim 2, wherein sulfite ion is present in an amount of at least 0.05 mole per liter of the entire system.

14. The process as claimed in claim 1, wherein said vinyl compound is added to said emulsion layer prior to imagewise exposure in an amount of from 1/30 to 30 times, by weight, the amount of gelatin in said emulsion layer, and wherein said naphthol derivative is added to said emulsion layer subsequent to imagewise exposure.

15. The process as claimed in claim 14, wherein the amount of said vinyl compound varies from ¼ to 4 times, by weight, the amount of gelatin in said emulsion layer.

16. The process as claimed in claim 1, wherein the amount of silver halide in said silver halide emulsion layer varies from 1/20 to 2 times, by weight, the amount of gelatin in said emulsion layer.

17. The process as claimed in claim 16, wherein the amount of silver halide in said emulsion layer varies from 1/10 to 1/2 times, by weight, the amount of gelatin in said emulsion layer.

18. The process as claimed in claim 1, wherein said naphthol derivative is added to said emulsion layer prior to imagewise exposure in an amount of from 1/10 to 20 mole per mole of silver halide present in said emulsion layer, the vinyl compound being added subsequent to imagewise exposure.

19. The process as claimed in claim 1, wherein said gelatin and said vinyl compound are mixed and coated onto a support to form a film prior to exposure, said film containing from 10 to 20,000 parts per million, by weight, of said vinyl compound of a polymerization inhibitor.

20. The process as claimed in claim 1, wherein said silver halide photographic emulsion is a film coated onto a support, and wherein said vinyl compound is polymerized by treating said film with an aqueous alkaline solution containing from 1/20 to 5 mols per liter of said naphthol derivative, and said vinyl compound in as high an amount as possible depending on the solubility of said vinyl compound in said aqueous alkaline solution.

21. The process as claimed in claim 20, wherein said naphthol derivative is present in said solution in an amount of from 1/10 to 1 mole per liter of solution.

References Cited
UNITED STATES PATENTS

| | | | |
|---|---|---|---|
| 3,019,104 | 1/1962 | Oster | 96—29 |
| 3,234,021 | 2/1966 | Schwerin et al. | 96—28 |

OTHER REFERENCES

Mees, C. E. K.: "The Theory of the Photographic Process," 1942, pp. 356–357.

RONALD H. SMITH, Primary Examiner

U.S. Cl. X.R.

96—35.1, 115 P